United States Patent [19]

Gowan

[11] Patent Number: 5,114,246
[45] Date of Patent: May 19, 1992

[54] FLOATING FLANGE HALF BEARING

[75] Inventor: James L. Gowan, Atlantic, Iowa

[73] Assignee: JPI Transportation Products, Inc., Ann Arbor, Mich.

[21] Appl. No.: 620,727

[22] Filed: Dec. 3, 1990

[51] Int. Cl.⁵ ................................................ F16C 9/02
[52] U.S. Cl. ..................................... 384/275; 384/294
[58] Field of Search ............... 384/275, 276, 788, 294, 384/295, 296, 424, 429, 273

[56] References Cited

U.S. PATENT DOCUMENTS

| | | | |
|---|---|---|---|
| 4,533,261 | 8/1985 | Losio | 384/296 |
| 4,702,624 | 10/1987 | Fontana | 384/294 |
| 4,845,817 | 7/1989 | Wilgus | 29/149.5 R |
| 4,924,523 | 5/1990 | Gojan | 384/275 X |
| 4,989,998 | 2/1991 | Willis | 384/294 X |

FOREIGN PATENT DOCUMENTS

| | | | |
|---|---|---|---|
| 317618 | 9/1974 | Austria | 384/296 |
| 1386253 | 3/1975 | United Kingdom | 384/296 |
| 8900250 | 1/1989 | World Int. Prop. O. | 384/294 |

Primary Examiner—Thomas R. Hannon
Attorney, Agent, or Firm—Harness, Dickey & Pierce

[57] ABSTRACT

A flanged half bearing for motor vehicle engine applications. The flanged half bearing is of the type having a semi-cylindrical shell provided with half thrust washers. The thrust washers are connected to the shell through the coacting of appendages on the thrust washers and recessed portions on the curved edge of the shell. Upon the insertion of the appendages into the recessed portions, the appendages are swaged to retentively engage the washer along the edge of the shell. After swaging, the dimensions of the recessed portion and appendages are such that the washer is capable of axially floating fore and aft relative to the shell, but is incapable of being disengaged from the shell. This provides a flanged half bearing which remains assembled during installation and allows for the accommodation of axial forces and thermal influence of the engine.

22 Claims, 4 Drawing Sheets

FLOATING FLANGE HALF BEARING

BACKGROUND AND SUMMARY OF THE INVENTION

The invention relates generally to bearings and more particularly to half bearings designed for use, although not exclusively, in the motor vehicle field. The half bearing of the present invention is a sleeve type half shell radial bearing having half thrust washers which provide for thrust or axial bearing capabilities.

In application, two semi-cylindrical shells, also called thin-wall inserts, are located in a support or housing through an interference fit. Most notably, half shell bearings are used in connecting rod and main bearings of gasoline and diesel engines.

Generally, flanged half shell bearings are of two types: the first type is a one piece variety in which the thrust washers or flanges are integrally formed with the curved edge of the shell itself, and a second type where the thrust washers are formed separate from a straight shell and are subsequently attached thereto. Each type has its own limitations and disadvantages.

The integral flanged half bearing entails a high cost of manufacture, complicated machining apparatus, and additional finishing steps. Moreover, the integral flanged half bearing operates at a higher temperature because of the reduced space between the flange and the engine block resulting from thermal expansion.

In the second type of flanged half shell bearings two general subclasses can be delineated. In the first subclass, the thrust washer is rigidly fixed to the shell by applying pressure axially to the washer and plastically deforming the shell. Again, manufacturing costs are relatively high and furthermore the rigidity of the connection between the thrust washers and the shell produce local tensions which eventually result in failure of the bearing. In the second subclass the thrust washers are free to move relative to the shell during use, thereby eliminating local tensions in the joining of the washer to the shell. Furthermore, this permits the washers to adjust themselves when positioned in the engine block and further decreases manufacturing costs. A particular problem with this type of flanged half bearing, illustrated in U.S. Pat. No. 4,533,261, is that the washer has a tendency to separate during normal handling and installation into the bearing housing.

Therefore, it is the object of the present invention to provide a flanged half bearing which does not separate when the half bearing is assembled into the engine block or housing.

It is another object of the present invention to provide a flanged half bearing where the washers are free to move axially when installed.

It is an additional object of the present invention to provide a flanged half bearing which does not restrain the free dimension of the straight shell to which it is attached.

In achieving the above objects the present invention includes a semi-cylindrical straight shell which is designed to be supported within a housing in an interference fit. Along the curved edges of the shell special cavities are symmetrically positioned. A thrust washer is attached to the shell along the curved edge. To facilitate this attachment, the thrust washer is provided with appendages corresponding in position to the cavities in the straight shell. The appendages and the cavities interfit and coact so as to retain the thrust washer in position on the shell. This engagement prevents separation of the washer from the shell while permitting fore and aft axial movement of the washer relative to the shell. The recessed portion of the straight shell is trapezoidal in shape with the base of the trapezoid being interiorly of the shell and having a dimension greater than the opening along the curved edge. The appendages of the washer are generally dovetailed and have a dimension which is slightly less than the opening along the curved edge but less than the dimension of the base of the recess portion. Upon being inserted into the cavities the washer is retainingly engaged with the straight shell by mechanically deforming or swaging the dovetailed appendage. Thus, the washer is inseparable from the shell and is free to move axially within the recessed portion thereof.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
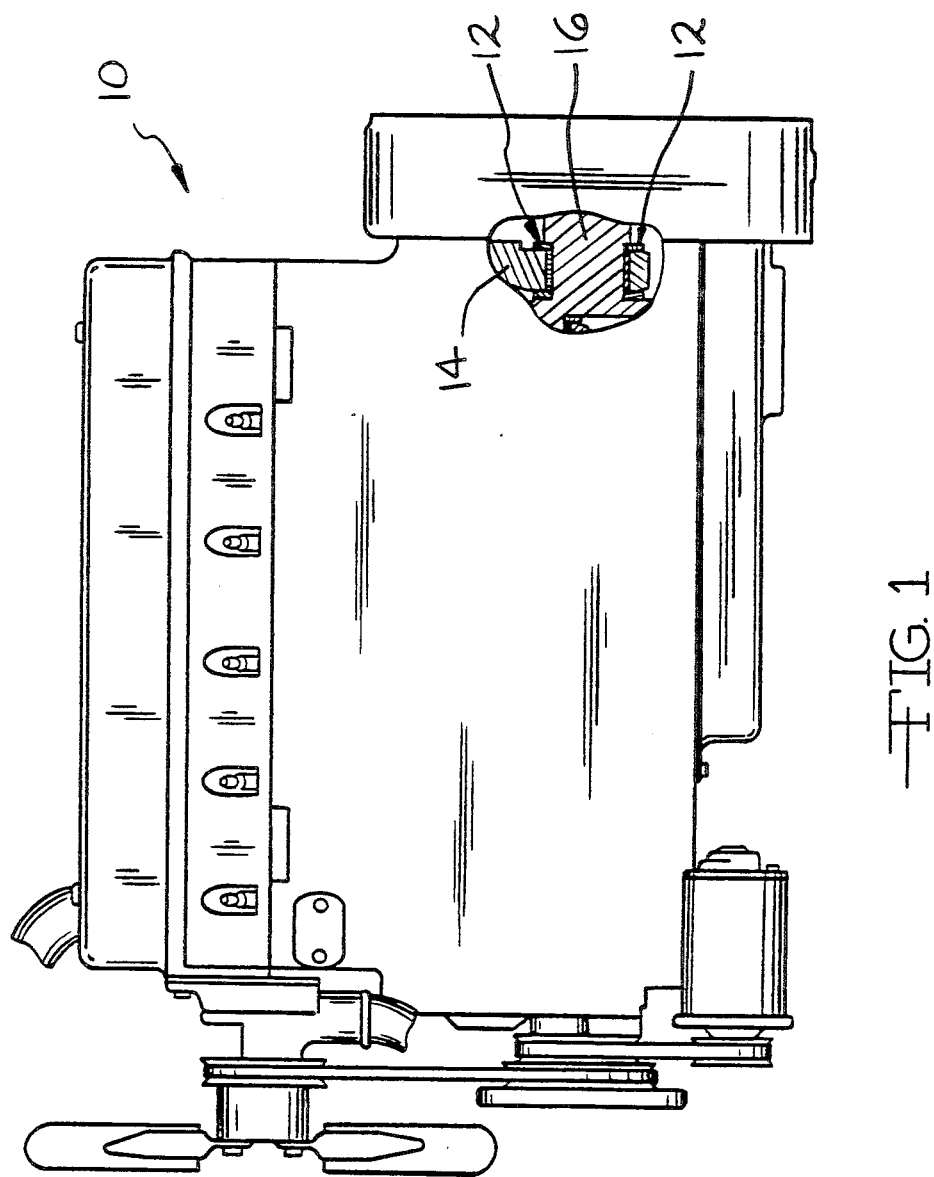
FIG. 1 is a side elevational view with a broken away portion illustrating a pair of half bearings positioned within a motor vehicle engine.
Figure 2:
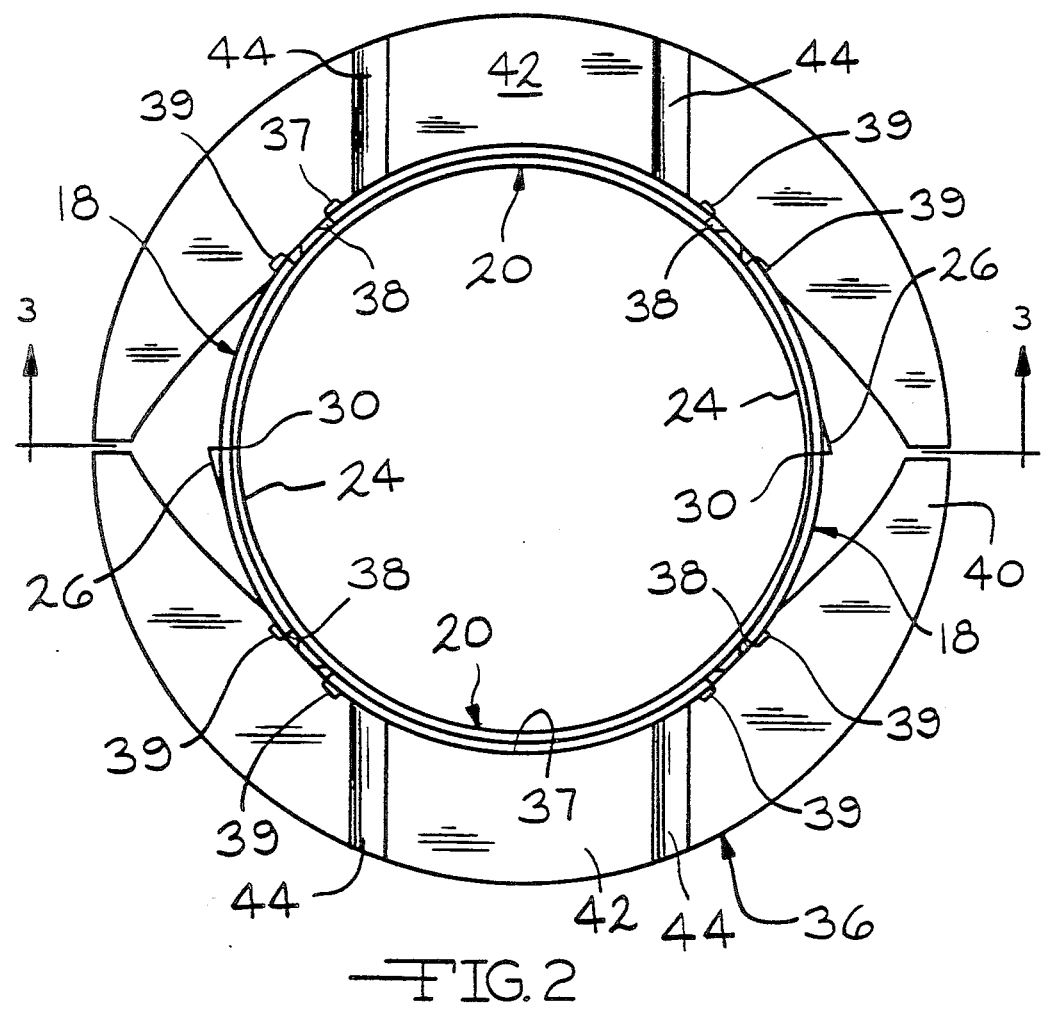
FIG. 2 is an elevational view of two half bearings positioned in generally assembled relation.
Figure 3:
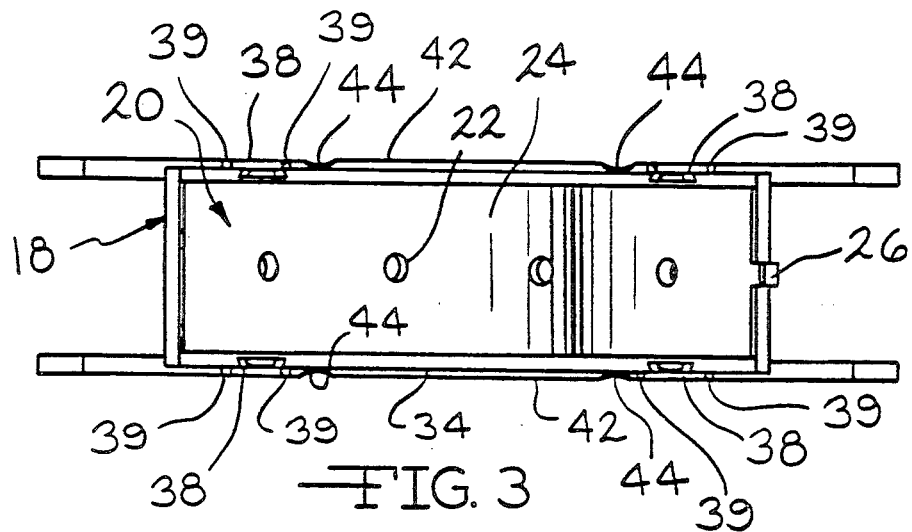
FIG. 3 is a cross sectional view taken generally along line 3—3 in FIG. 2 of a half bearing embodying the principles of the present invention.
Figure 6:
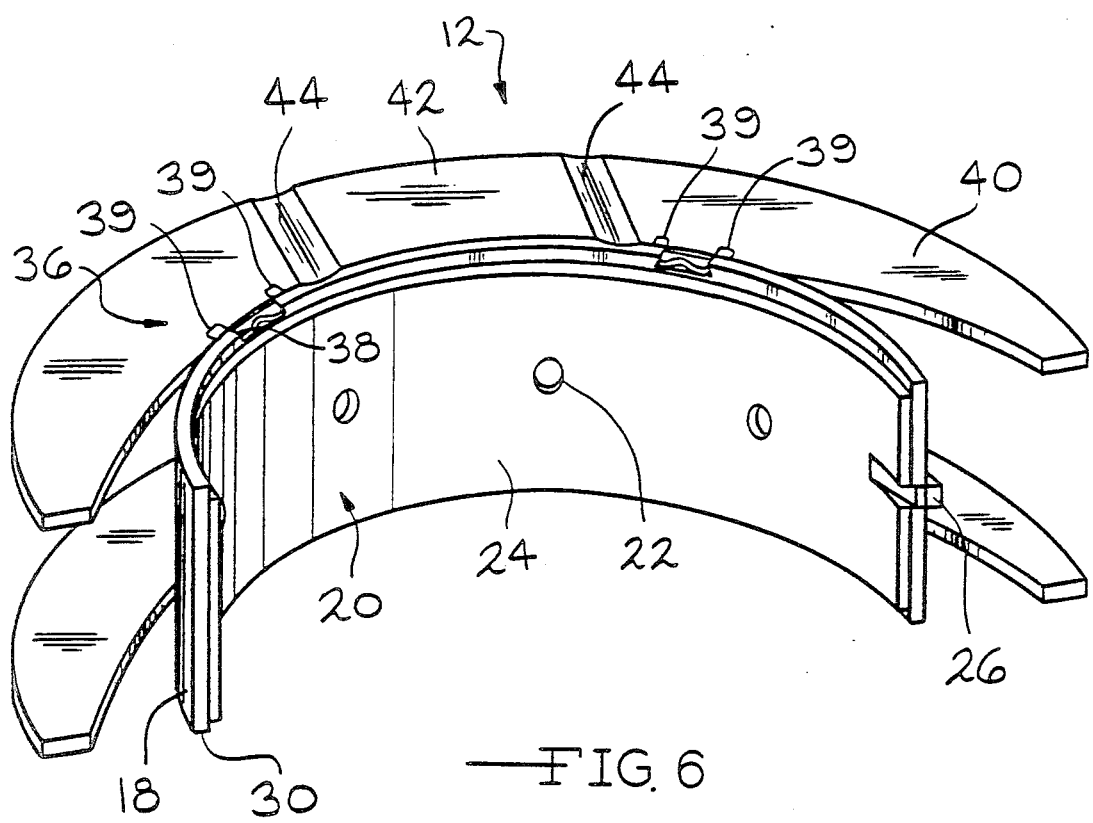
FIG. 6 is a perspective view of a half bearing according to this invention illustrating the washers being retained in engagement with the straight shell.

With reference to the drawing, a motor vehicle engine 10 is shown in FIG. 1 with a pair of half bearings 12 of this invention assembled between the engine block 14 and the connecting rod 16. Each half bearing 12 consists of an arcuate half shell 18 (FIGS. 2 and 6) which includes an inside crown area 20 that faces the outer surface of a rotating connecting rod 16. The surface of the crown 20 is coated with a bearing material 24. Various materials can be used as the bearing material 24 including babbits, copper-lead-tin alloys, bronze alloys and aluminum alloys. The bearing material 24 exhibits a low frictional or slippery characteristic to allow for marginal lubrication through an oil supply hole 22. A locating tab 26 is configured to be an outwardly displaced segment at the parting line 30 of the shell 1 which properly establishes the position of the bearing shells until the support housing or engine block 14 is completely assembled.

Figure 4:
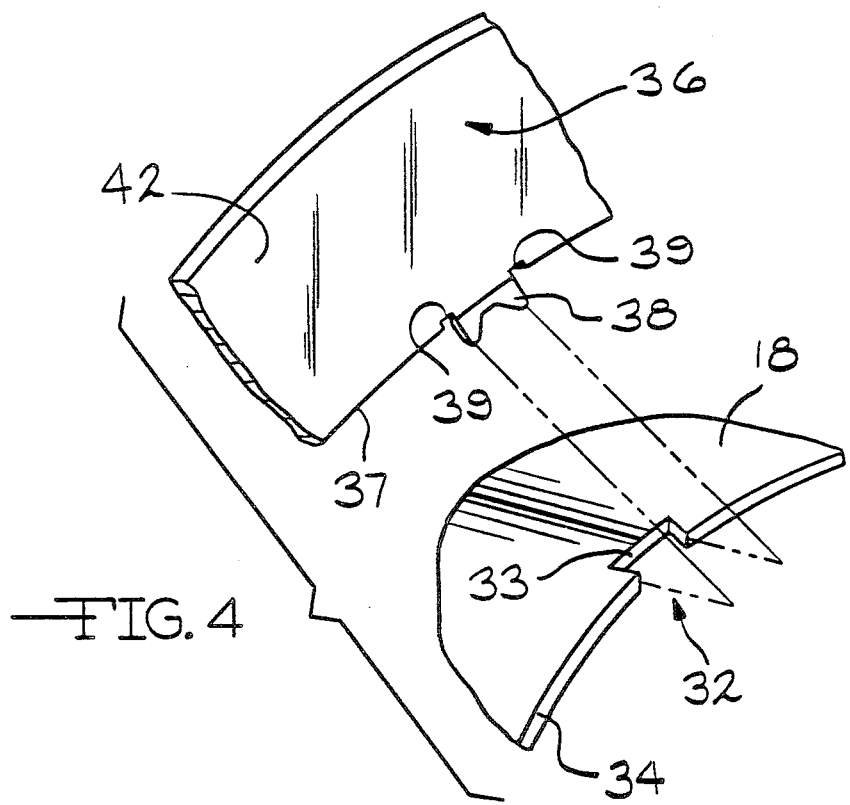
FIG. 4 is a greatly enlarged exploded perspective view illustrating the attachment structure embodied in the present invention.
Figure 5:
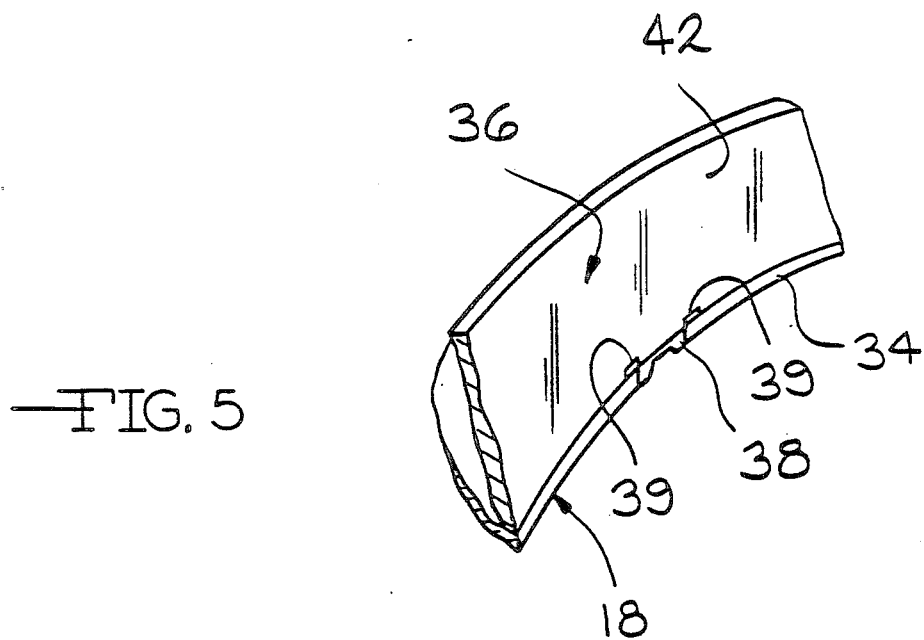
FIG. 5 is an enlarged perspective view of a portion of a completed half bearing embodying the principles of the present invention.

As best seen in FIG. 4 a cavity 32 is defined in the curved edge 34 in the straight shell 18. The cavity 32 is generally trapezoidal in shape having its base 33 spaced radially inwardly from the curved edge 34. While various shapes may be assumed by the cavity 32, applicant has found that an equilateral trapezoid is particularly effective for reasons discussed below.

The half bearing 12 further includes a thrust washer 36. The thrust washer 36 helps to axially position the journal rod 16 and receive axial loads from the rod 16. The thrust washers 36 are generally arch shape and have an edge portion 37 which exhibits a radius of curvature corresponding to that of the exterior of the shell 18. Arranged symmetrically on the thrust washer 36 are a pair of appendages or dovetails 38, each having immediate adjacent recessed areas 39 extending in directions away from the dovetails 38. Outward of the recessed areas 39 and toward the ends 40 of the thrust washer 36, the radius of curvature of the thrust washer 36 increases. The increase in radius of curvature allows for the thrust washer 36 to be spaced apart from the shell 18 at the ends 40 and parting line 30 respectively. In this manner, the thrust washer 36 does not restrict the free dimension or diameter of the shell 18. The face 42 of the thrust washer 36 is also provided with a pair of tapered entrance channels 44 which allow for lubricant to enter and lubricate the face 42 of the washer 36 as the crankshaft 16 rotates.

To assemble the washer 36 onto the shell 18, the dovetails 38 are positioned within the recessed portions 32 along the edge 34. Once so inserted, the dovetails 38 are swaged so as to retentively engage the washer 36 along the edge 34 of the shell 18. During swaging, the dovetails 38 are mechanically flared outwardly by punching or striking the V-notch centrally contained therein. In this manner, the dovetails 38 are spread apart to a point preventing their removal from the recessed portions 32. The recessed areas 39 prevent any deformation during swaging of the dovetails 38 which might cause binding of the washer 36 that would impact floating movement of the washer 36 relative to the shell 18. The width of the dovetails 38 and the shape of the recessed portion 32 are such that the dovetails extend into the recessed portions 32 without being axially disengagable through the opening along the edge 34. The shape the dovetails 38 also prevents the washer 36 from disengaging the shell 18 in a generally vertical fashion.

The thickness of the dovetail 38 is such that the washer 36 is free to float axially fore and aft in the recessed portion 32. Typically, such movement is only two to three thousandths of an inch. However, this movement is sufficient to allow for excellent load carrying capabilities in the thrust washer and the accommodation of thermal effects upon the half bearing 12 and other engine components.

While a half bearing 12 embodying the principles of the present invention may be constructed with only one thrust washer 36, it is preferable that a pair of thrust washers 36 be respectively engaged along the two curved edges 34 of a half shell 18.

While the above description constitutes the preferred embodiment of the present invention, it will be appreciated that the invention is susceptible to modification, variation and change without departing from the proper scope and fair meaning of the accompanying claims.

I claim:

1. A flanged half-bearing comprising a substantially semi-cylindrical shell adapted to be positioned within a support with slight interference between said shell and said support, said shell having a curved edge provided with at least one recessed portion therein and having at least one axial thrust half washer mounted thereon, said washer having a curved edge partially corresponding in shape to said shell curved edge and at least one appendage extending from said washer curved edge and projecting into said recessed portion, said appendage including a generally V-shaped notch being defined therein and forming a plurality of legs projecting into said recessed portion, said legs coacting with said recessed portion so as to retainingly engage said washer with said shell preventing separation of said washer from said shell, said washer being movable relative to said shell when retainingly engaged thereon to accommodate forces applied to said flanged half-bearing and dimensional changes resulting from thermal influences.

2. A flanged half-bearing as set forth in claim 1 wherein said washer is axially movable relative to said shell when retainingly engaged thereon.

3. A flanged half-bearing as set forth in claim 1 wherein said recessed portion extends along said shell curved edge and also extends in a direction generally transversely from said shell curved edge, said recessed portion being of a shape such that the outboard dimension of said recessed portion measured along said shell curved edge is less than the inboard dimension of said recessed portion measured along said shell curved edge so that in a direction transversely inboard of said shell and recessed portion is undercut.

4. A flanged half-bearing as set forth in claim 1 wherein said recessed portion is generally trapezoidal in shape.

5. A flanged half-bearing as set forth in claim 1 wherein said legs are flared outward relative to one another.

6. A flanged half-bearing as set forth in claim 1 wherein said shell includes a plurality of recessed portions symmetrically spaced apart along said shell curved edge.

7. A flanged half-bearing as set forth in claim 6 wherein said washer includes a plurality of appendages symmetrically spaced apart along said washer curved edge and coacting with said plurality of recessed portions.

8. A flanged half-bearing as set forth in claim 1 wherein said flanged half-bearing comprises two axial thrust washers being attached to said shell at opposing curved edges.

9. A flanged half-bearing comprising a substantially semi-cylindrical shell adapted to be positioned within a support with slight interference between said shell and said support, said shell having a curved edge provided with at least one recessed portion therein and having at least one axial thrust half washer mounted thereon, said washer having a curved edge partially corresponding in shape to said shell curved edge and at least one appendage extending from said washer curved edge, said washer including a plurality of recessed areas immediately adjacent opposing sides of said appendage, said appendage projecting into said recessed portion and coacting therewith so as to retainingly engage said washer with said shell preventing separation of said washer from said shell, said washer being movable relative to said shell when retainingly engaged thereon to accommodate forces applied to said flanged half-bearing and dimensional changes resulting form thermal influences.

10. A flanged half-bearing as set forth in claim 9 wherein said washer is axially movable relative to said shell when retainingly engaged thereon.

11. A flanged half-bearing as set forth in claim 9 wherein said recessed portion extends along said shell curved edge and also extends in a direction generally transversely from said shell curved edge, said recessed portion being of a shape such that the outboard dimension of said recessed portion measured along said shell curved edge is less than the inboard dimension of said recessed portion as measured generally along said shell curved edge so that in a direction transversely inboard of said shell curved edge said recessed portion is undercut.

12. A flanged half-bearing as set forth in claim 9 wherein said recessed portion is generally trapezoidal in shape.

13. A flanged half-bearing as set forth in claim 9 wherein said shell includes a plurality of recessed portions symmetrically spaced apart along said shell curved edge.

14. A flanged half-bearing as set forth in claim 13 wherein said washer includes a plurality of appendages symmetrically spaced apart along said washer curved edge and coacting with said plurality of recessed portions.

15. A flanged half-bearing as set forth in claim 9 wherein said flanged half-bearing comprises two axial thrust washers being attached to said shell at opposing curved edges.

16. A flanged half-bearing comprising a substantially semi-cylindrical shell adapted to be positioned within a support with slight interference between said shell and said support, said shell having a curved edge provided with at least one recessed portion therein and having at least one axial thrust half washer mounted thereon, said washer having a curved edge partially corresponding in shape to said shell curved edge and at least one appendage extending from said washer curved edge and projecting into said recessed portion, said appendage being swaged and coacting with said recessed portion so as to retainingly engage said washer with said shell preventing separation of said washer from said shell, said washer being movable relative to said shell while retainingly engaged thereon to accommodate forces applied to said flanged half-bearing and dimensional changes resulting from thermal influences.

17. A flanged half-bearing as set forth in claim 16 wherein said washer is axially movable relative to said shell when retainingly engaged thereon.

18. A flanged half-bearing as set forth in claim 16 wherein said recessed portion extends along said shell curved edge and also extends in a direction generally transversely from said shell curved edge, said recessed portion being of a shape such that the outboard dimension of said recessed portion measured along said shell curved edge is less than the inboard dimension of said recessed portion as measured generally along said shell curved edge so that in a direction transversely inboard of said shell curved edge said recessed portion is undercut.

19. A flanged half-bearing as set forth in claim 16 wherein said recessed portion is generally trapezoidal in shape.

20. A flanged half-bearing as set forth in claim 16 wherein said shell includes a plurality of recessed portions symmetrically spaced apart along said shell curved edge.

21. A flanged half-bearing as set forth in claim 20 wherein said washer includes a plurality of appendages symmetrically spaced apart along said washer curved edge and coacting with said plurality of recessed portions.

22. A flanged half-bearing as set forth in claim 16 wherein said flanged half-bearing comprises tow axial thrust washers being attached to said shell at opposing curved edges.

* * * * *